(12) United States Patent
Miyazaki et al.

(10) Patent No.: US 8,037,315 B2
(45) Date of Patent: Oct. 11, 2011

(54) INTEGRATED CIRCUIT CARD

(75) Inventors: Atsushi Miyazaki, Nagano-ken (JP); Hideyuki Kawai, Nagano-ken (JP)

(73) Assignee: Seiko Epson Corporation (JP)

( * ) Notice: Subject to any disclaimer, the term of this patent is extended or adjusted under 35 U.S.C. 154(b) by 1462 days.

(21) Appl. No.: 11/210,665

(22) Filed: Aug. 25, 2005

(65) Prior Publication Data

US 2006/0047971 A1  Mar. 2, 2006

(30) Foreign Application Priority Data

Aug. 25, 2004  (JP) ................................. 2004-245031

(51) Int. Cl.
  *H04K 1/00*  (2006.01)
(52) U.S. Cl. ....................................... 713/186; 382/115
(58) Field of Classification Search .................. 713/186, 713/182; 382/115, 124
  See application file for complete search history.

(56) References Cited

U.S. PATENT DOCUMENTS

| | | | | |
|---|---|---|---|---|
| 4,720,626 A | * | 1/1988 | Nishikawa et al. | 235/449 |
| 5,708,908 A | * | 1/1998 | Hirata et al. | 399/8 |
| 7,159,121 B2 | * | 1/2007 | Takaragi | 713/186 |
| 2001/0037388 A1 | * | 11/2001 | Suzuki | 709/225 |
| 2002/0049908 A1 | * | 4/2002 | Shimosato et al. | 713/186 |

FOREIGN PATENT DOCUMENTS

| | | |
|---|---|---|
| JP | 63-280693 | 11/1988 |
| JP | 64-069394 | 3/1989 |
| JP | 04-255089 | 9/1992 |
| JP | 10-154215 | 6/1998 |
| JP | 2002-24730 | 1/2002 |
| JP | 2004-64650 | 2/2004 |
| JP | 2004164347 A * | 6/2004 |
| JP | 2004-164347 | 6/2005 |

OTHER PUBLICATIONS

Machine translation of Naohisa (JP 2004-164347) submitted by the applicant in the IDS filed on Jul. 17, 2007.*
English translation of Takao (JP S64-069394) submitted by the applicant in the IDS filed on Jul. 17, 2007. Translated by Schreiber translation, Inc. for the USPTO on Feb. 2010.*
Patent Abstracts of Japan, Publication No. 2002-024730, Publication Date Jan. 25, 2002, 2 pages.
Patent Abstracts of Japan, Publication No. 2004-064650, Publication Date Feb. 26, 2004, 2 pages.

* cited by examiner

*Primary Examiner* — Benjamin Lanier
*Assistant Examiner* — Hadi Armouche
(74) *Attorney, Agent, or Firm* — Harness, Dickey & Pierce, P.L.C.

(57) ABSTRACT

An IC card includes a capacitance type fingerprint sensor, a display device, and a control unit. The display device displays an encrypted image that is readable by an external device. The control unit controls the capacitance type fingerprint sensor and the display device. The control unit erases the encrypted image that is displayed by the display device.

13 Claims, 7 Drawing Sheets

INTEGRATED CIRCUIT CARD

This application claims priority to Japanese Patent Application No. 2004-245031, filed Aug. 25, 2004, whose contents are expressly incorporated herein by reference.

BACKGROUND OF THE INVENTION

1. Technical Field

Aspects of the present invention relate to an integrated circuit (IC) card having a fingerprint sensor.

2. Related Art

An IC card (Smart Card) is a card in which an integrated circuit (IC) is embedded. Compared with a magnetic strip card, the IC card has many advantages such as high information capacity, increased security (prevention of forgery and alteration), compatibleness with multiple applications, and load reduction of a host (off-line processing is possible). For these reasons, the IC card is starting to see introductions in the electric money and electric commerce fields, medical and health fields, transportation fields including railroads and route buses, security fields (such as a control of access to buildings) and other fields, in addition to card applications such as credit cards and ATM cards. In keeping with this trend, an IC card having a fingerprint sensor and a function of identification is proposed in order to further improve security (information protection, access restriction and the like).

Japanese Unexamined Patent Publication No. 2004-64650 is a first example of related art. The first example describes such IC card having a function of identification and its art. Japanese Unexamined Patent Publication No. 2002-24730 is a second example of related art. The second example describes an electronic payment system in which a barcode is shown on a display of a cellular phone and the barcode is read by a barcode reader to make a payment.

However, techniques described in the above-mentioned examples, which are used in order to provide security for users, are insufficient to ensure strong security for systems.

SUMMARY

An advantage of the present invention is to provide an IC card with higher security.

According to an aspect of the invention, an IC card includes a capacitance-type fingerprint sensor and a display device displaying an encrypted image that is readable by an external device.

An authentication of a user of the IC card can be carried out with the provided capacitance-type fingerprint sensor. Therefore, the user can be limited to a specific user and a misuse of the IC card is prevented.

The IC card according to the aspect of the invention not only used to conduct the above-mentioned authentication but also has the display device displaying the encrypted image which can be read by the external device. Therefore, the IC card with higher security can be realized since the information-communication through the encrypted image is possible in addition to the fingerprint authentication.

Meanwhile, as means of the information-communication, antennas may be provided in the IC card and the external device can be used to electromagnetically communicate. However, such electromagnetic means may or may not be used according to the aspects of the invention. The display device in the IC card displays the encrypted image and the external device reads the encrypted image. In this way, the information-communication is carried out. Accordingly, the user of the IC card can actually look and confirm that the image is displayed on the IC card or not, and then make the external device to read the image. On the contrary, the user cannot see with his eyes and confirm the information with the electromagnetic means. Therefore, the aspect of the invention has an advantage that the user can actually see with his eyes and confirm that the image is displayed on the IC card and then cause the external device to read the image.

In this case, the display device may be an electrophoretic display device (EPD). When a drive element such as a thin film transistor (TFT) provides a predetermined voltage for a predetermined period of time, the EPD is able to hold the image without further applying the voltage. In other words, the EPD has a feature of storing or memorizing a displayed image. With such EPD, power consumed by the display can be reduced. Therefore, it is possible to realize the IC card with the display memory and the low power consumption.

It is preferable that the IC card further includes a control unit controlling the capacitance type fingerprint sensor and the display device.

In this way, the capacitance type fingerprint sensor and the display device are controlled as well as obtaining the above-mentioned advantages of the IC card.

Furthermore, in the IC card according to the aspect of the invention, the control unit may compare an extract fingerprint pattern that is extracted by the capacitance type fingerprint sensor with a recognition fingerprint pattern that is registered in advance. In this way, the authentication can be performed based on a result of the comparison between the extract fingerprint pattern and the recognition fingerprint pattern as well as obtaining the above-mentioned advantages of the IC card.

It is preferable that the control unit erases the encrypted image that is displayed by the display device.

As described above, the EPD has the feature of storing or memorizing a displayed image. The IC card can be invalidated by erasing the image when the use of the IC card is finished. The image remained on the EPD is erased so that the misuse of the IC card utilizing the remained image will be prevented. Consequently, the IC card having higher security can be realized.

It is preferable that the control unit automatically renews the encrypted image.

Here, "automatically renews the encrypted image" means that the image used between the external device and the IC card for the authentication is redrawn when the use of the IC card finishes.

In this way, the encrypted image for the authentication that is used between the external device and the IC card is refreshed every time the IC card is used. Accordingly, the encrypted image which is once displayed on the EPD or the encrypted image which has been authenticated by the external device can be invalidated when the IC card is used the next time. This means that the external device uses a new and different encrypted image for the authentication every time the IC card is used. Therefore, it is possible to realize the IC card that has higher security.

It is also preferable that the control unit stores a plurality of applications. In this way, the plurality of the applications can be available with the IC card as well as obtaining the above-mentioned advantages of the IC card.

It is also preferable that the control unit stores a plurality of recognition fingerprint patterns that are registered in advance.

In this way, a plurality of users can use the IC card as well as obtaining the above-mentioned advantages of the IC card.

In the IC card according to the aspect of the invention, it is preferable that the control unit stores an available recognition fingerprint pattern with respect to each of the plurality of the applications.

In this way, the user of the IC card can be limited with respect to each application. Consequently, the IC card with higher security can be realized in addition to the above-mentioned advantages.

It is preferable that the IC card according to the aspect of the invention further includes a selector selecting any of the plurality of the applications that are stored in the control unit.

Besides the above-mentioned advantages, any of the applications that are available in the IC card can be selected by the selector.

It is preferable that the IC card according to the aspect of the invention further includes an external connection terminal that is connectable to the external device.

In this way, the information transmission between the IC card and the external device can be conducted through the external connection terminal.

It is also preferable that the IC card according to the aspect of the invention further includes a solar cell.

In this way, the IC card can be driven by electric power that is generated by the irradiation of light. The solar cell can also serve as a so-called light sensor in which electric current runs when it is irradiated with light. Therefore, it is possible to realize the IC card with the light switch which responds to the irradiation of light.

BRIEF DESCRIPTION OF THE DRAWINGS

Aspects of the invention will be described with reference to the accompanying drawings, wherein like numbers refer to like elements, and wherein.

DESCRIPTION

It is noted that various connections are set forth between elements and/or components in the following description. It is noted that these connections in general and, unless specified otherwise, may be direct or indirect and that this specification is not intended to be limiting in this respect.

First Embodiment of IC Card

Figure 1:
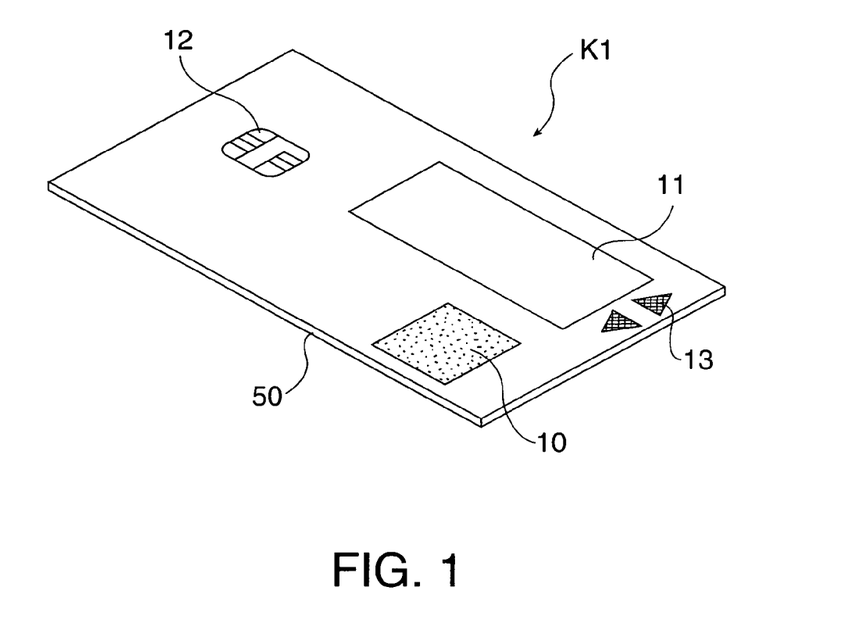
FIG. 1 is a perspective view of an IC card of a first embodiment.
Figure 2:
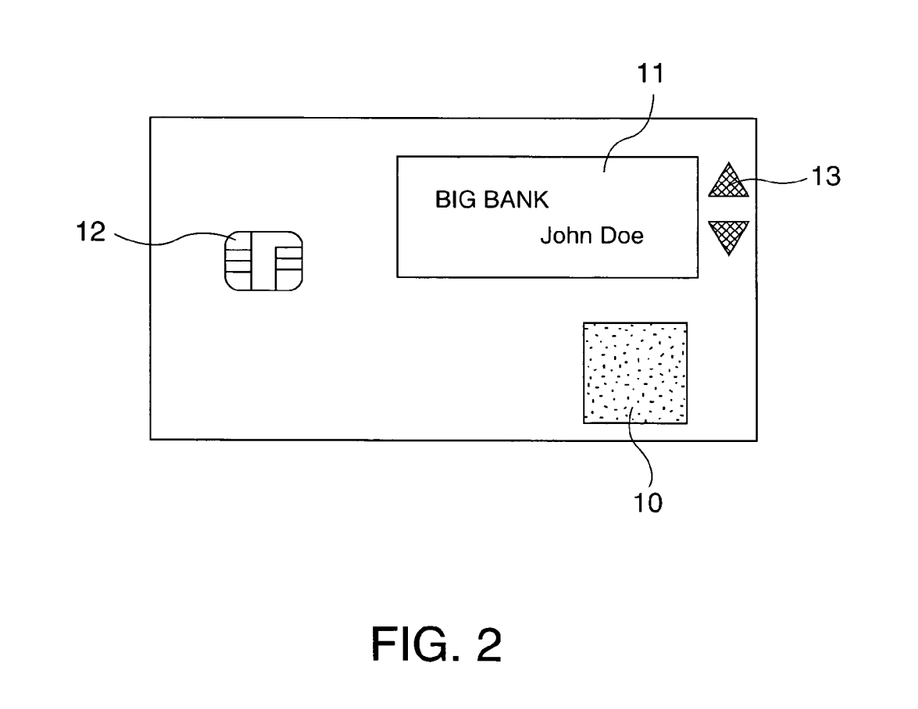
FIG. 2 is a plan view of the IC card of the first embodiment.

FIG. 1 is a perspective view of an IC card K1 according to a first embodiment and FIG. 2 is a plan view of the IC card K1.

IC card K1 includes a substrate 50, a fingerprint sensor 10, an electrophoretic display 11 (hereinafter, "EPD") (a display device), a connecting IC terminal 12 (a terminal for external connection) and a switch 13 (means of selection). The substrate 50 consists of two substrates made of plastic and the like. An integrated circuit (a control unit) such as an IC chip that may be interposed between the two plastic substrates is provided in the substrate 50.

Next, substantial parts of the IC card K1 are described in detail with reference to FIG. 3-5.

(Fingerprint Sensor)

Figure 3:
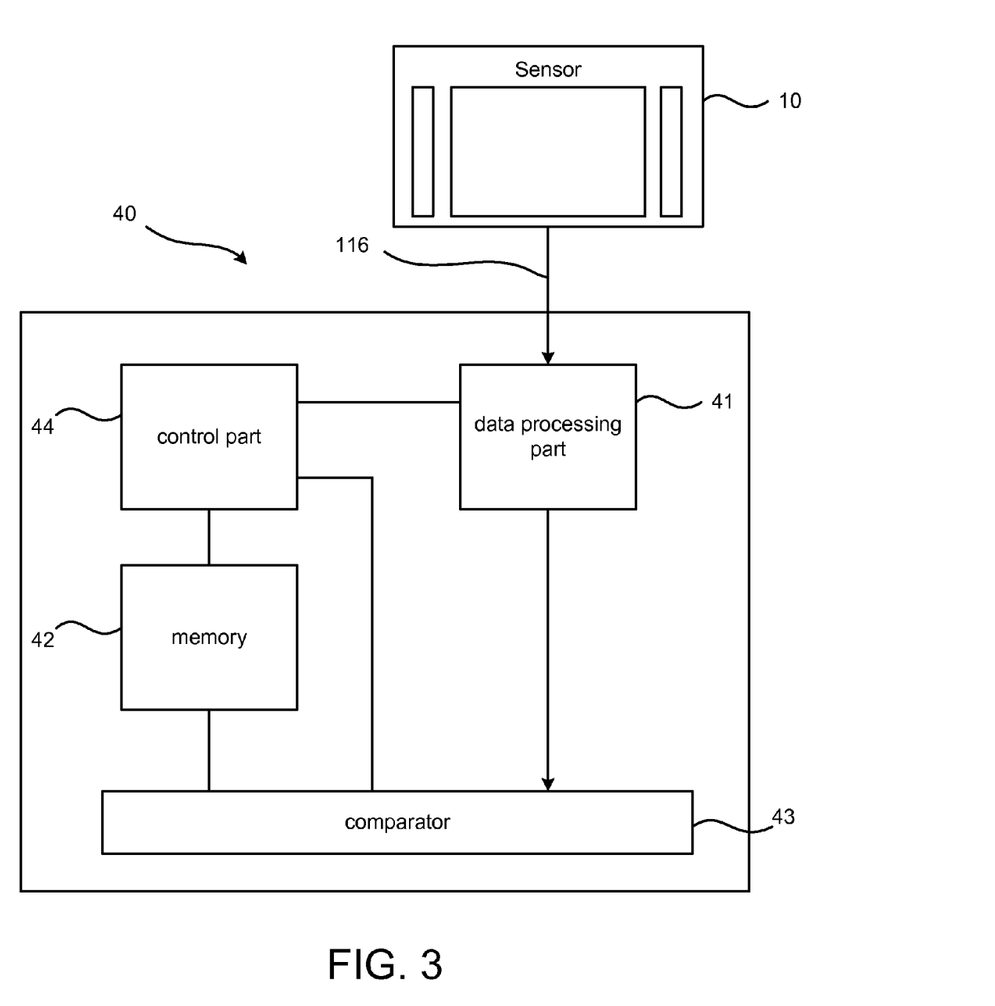
FIG. 3 is a block diagram showing a processing unit which processes information inputted from a fingerprint sensor in accordance with aspects of the present invention.

FIG. 3 is a block diagram for explaining a processing unit 40 which processes information inputted from the fingerprint sensor 10. FIG. 4 schematically shows a structure of the fingerprint sensor 10.

As shown in FIG. 3, the processing unit 40 (control unit) includes a data processing part 41, a memory 42, a comparator 43 and a control part 44 which controls the operation of the IC card K1. The data processing part 41 extracts a character of a fingerprint pattern (extract fingerprint pattern) which is scanned through the fingerprint sensor 10. The memory 42 stores various types of information such as feature quantity of a specific fingerprint pattern (recognition fingerprint pattern). The comparator 43 compares the feature quantity that is extracted by the data processing part 41 with the feature quantity that is stored in the memory 42.

Figure 4:
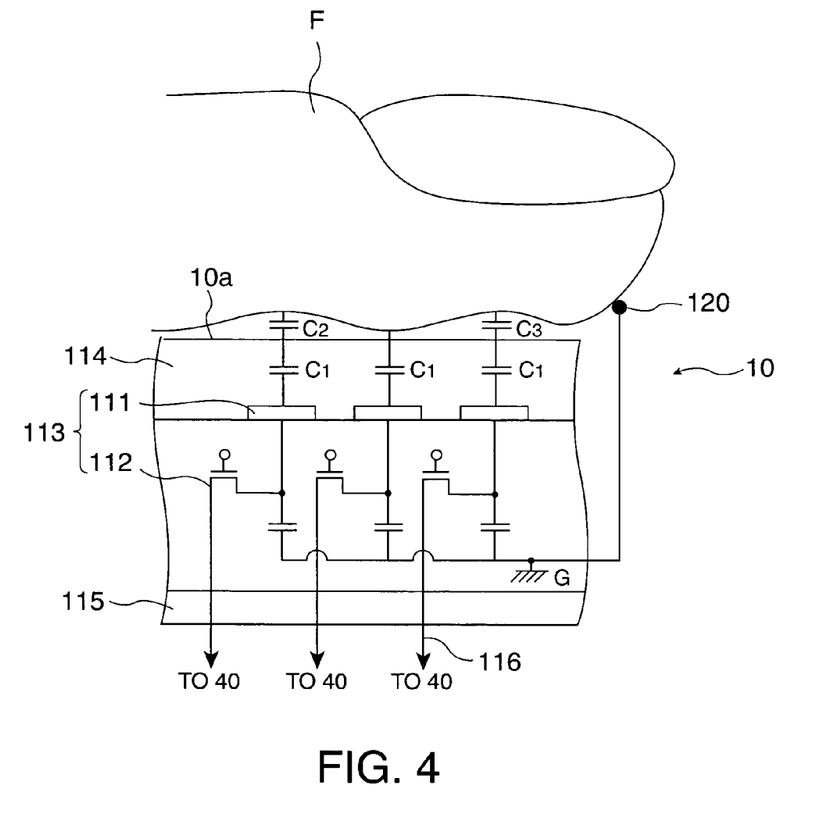
FIG. 4 schematically shows a structure of the fingerprint sensor in accordance with aspects of the present invention.

As shown in FIG. 4, the fingerprint sensor 10 is a capacitance-type fingerprint sensor. In other words, a fingerprint pattern is detected by determining capacitance which varies due to a distance between the fingerprint having concavity and convexity and a detection surface 10a. Such capacitance type fingerprint sensor 10 can be easily made to have a thinner shape because it does not require a source of light. In addition, it is possible to enhance the durability of the sensor by adequately selecting a surface protection layer (passivation film).

The fingerprint sensor 10 has a sensor substrate 115. On the sensor substrate 115, a plurality of scan lines and a plurality of signal lines 116 are provided though they are not shown in the figures. Each of the scan lines is formed in parallel and a predetermined space is provided between each two lines. Each of the signal lines 116 is also formed in parallel and with a predetermined space there between. Each of the signal lines 116 is provided so as to orthogonally cross the scan lines.

A switching element 112 (detection circuit) is provided at each of points corresponding to the intersections of the plurality of the scan lines and the plurality of the signal lines 116.

An active matrix array 113 consists of the scan lines, the signal lines 116 and the switching elements 112. On the active matrix array, a sensing electrode 111 is provided at each point corresponding to each switching element 112 and which forms a matrix.

Each sensing electrode 111 is covered with an insulating film 114 (passivation film) that covers the whole surface of the active matrix array 113. The insulating film 114 is provided so as to be contactable with a finger F of a user of the IC card K1.

A metal-oxide semiconductor (MOS) transistor array formed on a semiconductor substrate, a thin film transistor (TFT) formed on an insulating substrate and the like can be used as the active matrix array 113.

In the fingerprint sensor 10 having the above-mentioned structure, when the finger F touches the detection surface 10a, capacitance (C1, C2, C3 and so on in FIG. 4) distributed in two dimensions is generated between the finger F and each sensing electrode 111 (which is provided in matrix). A minute asperity pattern (extract fingerprint pattern) formed on the surface of the finger F can be detected by electrically reading each value of the two-dimensional capacitance with the active matrix array 113. In order to prevent a discharge breakdown cased by static electricity with which a human body is charged from occurring, tone can discharge the static electricity charged on the finger F. One can also make the electric potential of the finger F substantially same with the ground level (reference potential) of the switching element 112 before conducting the detection. Furthermore, in order to stably determine the each value of the capacitance, the electric potential of the finger F is preferably fixed at a predetermined potential at the time of the detection.

For this reason, another electrode other than the sensing electrode (in other words, a discharge electrode 120 for discharging the static electricity charged on the human body) is provided on the substrate 50 of the IC card K1.

(EPD)

Figure 5:
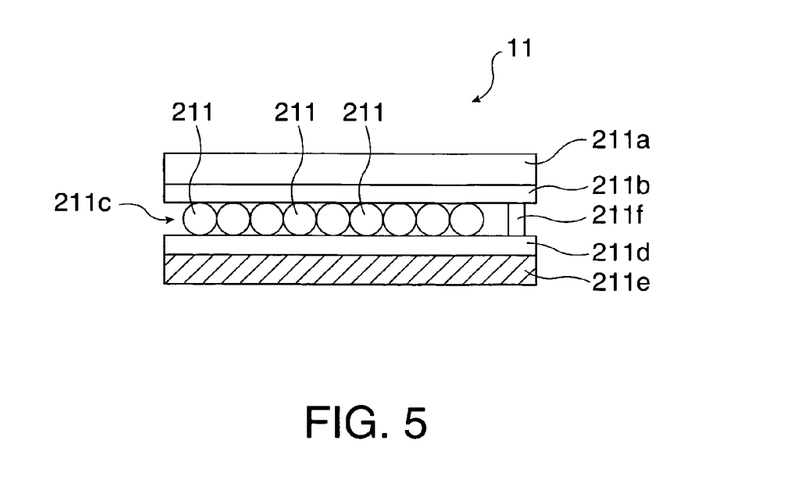
FIG. 5 is a sectional view of an electrophoretic display device (EPD) in accordance with aspects of the present invention.

FIG. 5 is a sectional view of an electrophoretic display device (EPD) 11. An electrode film 211*d*, an electrophoretic display layer 211*c*, an electrode film 211*b* and a surface protection layer 211*a* that protects the display part are multi-layered on an EPD substrate 211*e* (which is flexible and can be made of plastic and the like). Here, the surface protection layer 211*a* can be omitted.

The electrode film 211*b* consists of a transparent plastic film and an electrode formed on the plastic film. The plastic film may be formed of materials with a fine dimensional stability such as polyethylene terephthalate (PET), polyethylene naphthalate (PEN) and polyimide. The electrode film 211*d* also consists of a backing material and the electrode though it is not necessarily transparent. A vertical conducting electrode 211*f* makes the electrode film 211*b* electrically continuous with the electrode film 211*d*.

The electrode film 211*b* becomes a common electrode and the same electric potential is given to the whole area of the common electrode. On the other hand, an active matrix electrode or a segment electrode and the like can be formed on the electrode film 211*b* and the electrode film 211*d* becomes a drive electrode.

A microcapsule 211 forms the electrophoretic display layer 211*c* and a capsule shell of the microcapsule 211 is made of, for example, a composite film of gelatin and gum arabic, urethane resin, urea resin and the like. As a method of forming the capsule shell, for example, interfacial polymerization method, in-situ polymerization method, phase separation method, interfacial precipitation method, spray-drying method, and other micro-capsulation method can be used. Electrophoretic particles and dispersion medium are enclosed in the microcapsule. The electrophoretic particle can be an organic or inorganic particle (polymer molecule or colloid). As the electrophoretic particle, for example, aniline black, carbon black, or other black pigments, titanium dioxide, zinc oxide, antimony trioxide, and other white pigments, monoazo, dis-azo, polyazo, and other azo-based pigments, isoindolenone, yellow lead oxide, yellow iron oxide, cadmium yellow, titanium yellow, antimony, and other yellow pigments, monoazo, dis-azo, polyazo, and other azo-based pigments, quinacrilidone red, chrome vermillion, and other red pigments, phthalocyanine blue, indanthrene blue, anthraquinone-based dyes, prussian blue, ultramarine blue, cobalt blue, and other blue pigments, phthalocyanine green and other green pigments alone or in combinations of two or more types can be used. The dispersion medium may be colorless or colored by colorant. As the dispersion medium, for example, water, methanol, ethanol, isopropanol, butanol, octanol, methyl cellosolve, and other alcohol-based solvents, ethyl acetate, butyl acetate, and other various esters, acetone, methylethylketone, methylisobutylketone, and other ketones, pentane, hexane, octane, and other aliphatic hydrocarbons, cyclohexane, methylcyclohexane, and other alicyclic hydrocarbons can be used. Also, benzene, toluene, xylene, hexylbenzene, hebutylbenzene, octylbenzene, nonylbenzene, decylbenzene, undecylbenzene, dodecylbenzene, tridecylbenzene, tetradecylbenzen, and other aromatic hydrocarbons having long-chain alkyl, methylene chloride, chloroform, carbon tetrachloride, 1,2-cycloethane, and other halogenated hydrocarbons, carboxylates, and other various oils and the like alone or in mixtures plus a surfactant etc. can be used as the dispersion medium.

In the electrophoretic display device, the electrophoretic particle is positively or negatively charged in advance and colored in a different color from that of the dispersion medium. For example, assume that a titanium oxide particle (which is white is positively charged) and a carbon black particle (which is black is negatively charged). An electric field is applied to the two electrode films 211*b* and 211*d*. When the electrode film 211*b* becomes a negative electrode and the electrode film 211*d* becomes a positive electrode, the positively charged white particle is drawn to the side of the electrode film 211*b* and the black particle is drawn to the side of the electrode film 211*d*. If the electrode film 211*b* is transparent electrode, the part where the particles are drawn looks white when it is observed from up above the side of the electrode film 211*b*. On the contrary, when the electrode film 211*b* becomes the positive electrode and the electrode film 211*d* becomes the negative electrode, the positively charged white particle is drawn to the side of the electrode film 211*d* and the black particle is drawn to the side of the electrode film 211*b*. Consequently, the part where the particles are drawn looks black when it is observed from up above the side of the electrode film 211*b*.

The EPD 11 has a plurality of the above-described microcapsules 211 and a desired letter, number and symbol can be displayed in black and white picture elements by controlling the electric field which is applied to each address electrode in the electrode films 211*b* and 211*d*.

If the microcapsules 211 are driven by an active matrix driving method, the electrode film 211*d* is separately patterned with respect to each picture element as a picture electrode. In addition, a thin film transistor (not shown), a signal electrode (not shown), and a scan electrode (not shown) can also be provided. The electrode film 211*b* is made as a transparent common electrode (which is evenly formed on a transparent substrate). In this case, the electrode film 211*b* is made as the common electrode, and the whole area of the electrode has the same electric potential (for example, the potential is zero). Therefore, the particles in the microcapsule 211 placed at the corresponding electrode can be moved on the above-mentioned principle by controlling the electric field (giving a positive or negative electric potential) which is applied to each address electrode in the electrode film 211*d*. In this way, a desired image is displayed. In the same way, the electrode film 211*d* may be made as the common electrode, and the particles in the microcapsule 211 placed at the corresponding electrode may be moved by controlling the electric field which is applied to each address electrode in the electrode film 211*b*. In this way, a desired image is also displayed.

In a case of a time division driving method, the electrode films 211*b* and 211*d* are transparent electrodes (which have a liner shape and are made of indium tin oxide (ITO) and the like). The electrode film 211*b* orthogonally crosses the electrode film 211*d* and the microcapsule 211 is placed at the intersection of the electrodes.

The driving method is not limited to the above-mentioned ones but most appropriate one may be selected according to an application. Moreover, a diameter of the microcapsule 211 may be varied.

The connecting IC terminal 12 is coupled to a terminal of an external device (not shown) when information is transmitted between the IC card K1 and the external device. The connecting IC terminal 12 is also coupled to the IC chip provided in the IC card K1, and an input and output signals are transmitted between the external device and the IC chip. The switch 13 is for selecting and deciding the application which is available in the IC card K1. A plurality of applications is displayed on the above-described EPD 11. The applications displayed on the EPD 11 are selected and determined by scrolling using the switch 13.

The switch 13 is used not only for selecting and deciding the application but also can be used for switching the power of the IC card K1 to an ON state (power on) from an OFF state (power off). Alternatively, one may also use a dedicated switch to turn off the card. Further, inactivity may further cause a processor in the card to turn itself off (or go to sleep).

The IC chip embedded in the IC card K1 has an operation circuit such as a CPU, a driving circuit such as a driver, and a memory circuit such as a read only memory (ROM) and a random access memory (RAM). Such IC chip serves as the control unit in the embodiment of the invention.

Operation of the fingerprint sensor 10 and the EPD 11 are controlled by the operation of these circuits. More specifically, a judgment of an input signal in the fingerprint sensor 10 and a display control of the EPD 11 are conducted by these circuits. The input from the switch 13 and the communication with the external device through the connecting IC terminal 12 are also conducted by these circuits. Furthermore, the IC chip can store a plurality of applications which use the IC card, programs corresponding to the applications and encrypted image information. Moreover, the IC chip starts the program according to the communication with the external device and displays the coded image on the EPD 11. The IC chip also renews the encrypted image.

Modification Example of IC Card

Figure 6:
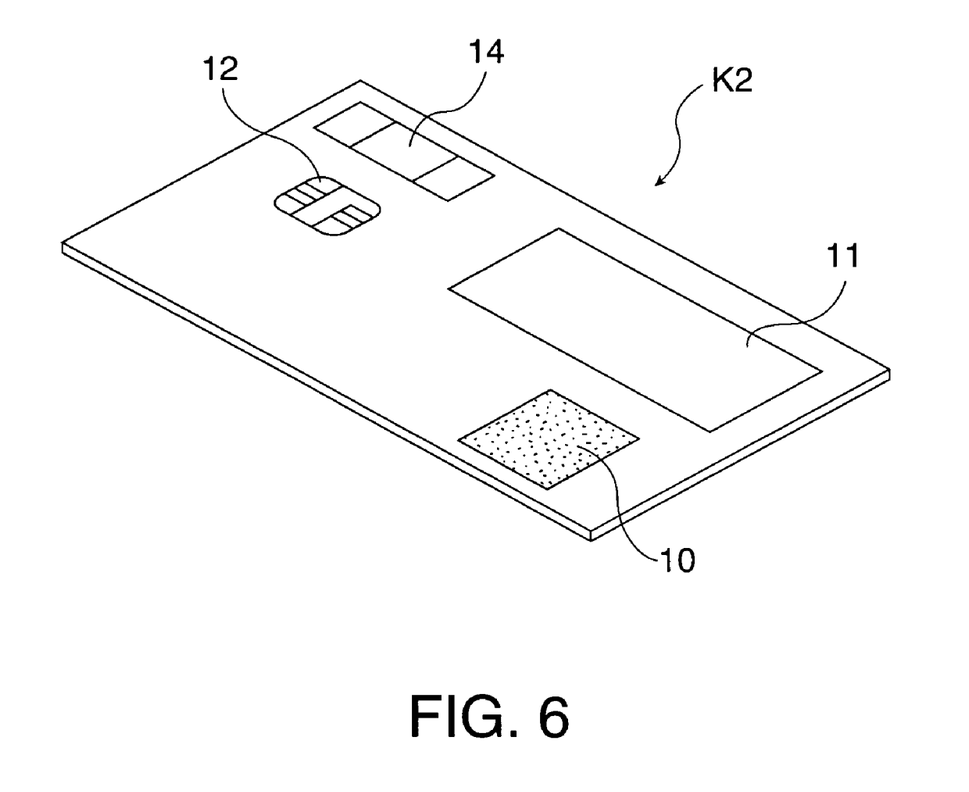
FIG. 6 is a perspective view showing a modification example of the IC card of the first embodiment in accordance with aspects of the present invention.

Next, a modification example of the above-mentioned IC card will now be described. FIG. 6 is a perspective view of an IC card K2 according to the modification example. In this modification example, the IC card K2 has a solar cell 14.

In the solar cell 14, light energy of an irradiated light from the outside of the IC card K2 is converted into electrical energy. The IC card K2 also has an unshown battery charger inside, and the battery charger is charged with the electrical energy converted by the solar cell 14.

The solar cell 14 not only converts the light energy into the electrical energy but also serves as a so-called light sensor in which electric current runs when it is irradiated with light. In this way, the solar cell 14 serves as a switch for switching the power of the IC card K2 to the ON state (power on) from the OFF state (power off) when the IC card K2 is irradiated with outside light.

The solar cell 14 and the battery charger charging the electrical energy are coupled to the IC chip embedded in the IC card K2. Consequently, the IC chip processes an input signal from the solar cell 14 and supplies the electrical energy which is charged in the battery charger to the EPD 11.
(Transactions Using IC Card)

Next, transactions using the above-mentioned IC card will now be described.

Figure 7:
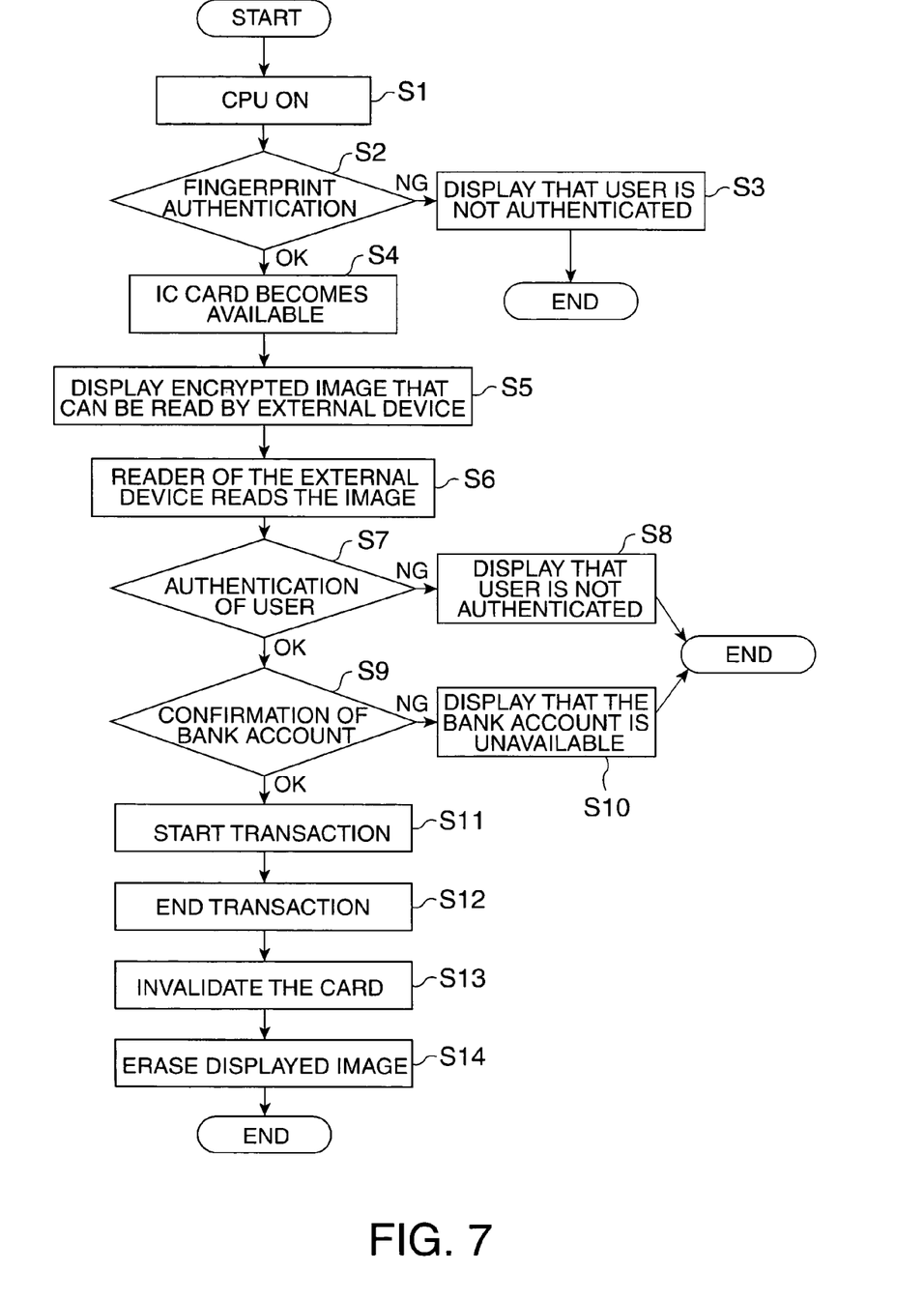
FIG. 7 is a flow chart of a transaction using the IC card of the first embodiment in accordance with aspects of the present invention.

In this embodiment, transactions of an automated teller machine (ATM) in financial institutions such as a bank is taken for an application example and described. FIG. 7 is a flow chart of an ATM transaction using the IC card of the embodiment.

Next, the transaction is described according to the flow chart.

First, turn the power of the CPU in the IC card on (Step 1 or S1). When the switch 13 is turned on, the fingerprint sensor 10 is touched by a user or when the solar cell 14 is irradiated with the outside light, the CPU is turned on in Step 1.

Next, conduct fingerprint authentication (Step 2 or S2).

Step 2 is carried out when the finger F of the user contacts with the fingerprint sensor 10 as shown in FIG. 4. If the fingerprint of the user disagrees with a fingerprint which is set up in advance as a result of the fingerprint authentication (Step 3 or S3), the user is not authenticated. In this case, information telling that the user is not authenticated will be displayed on the EPD 11. The use of the IC card is then ended.

On the other hand, when the fingerprint of the user agrees with the fingerprint which is set up in advance as a result of the fingerprint authentication, the IC card is made to be available (Step 4 or S4). This allows the user to further carry out the ATM transaction.

Next, the EPD 11 displays an encrypted image which can be read by the external device (Step 5 or S5). In this way, encrypted information will be displayed on the EPD 11. Here, as the encrypted information, there are a login password, a personal code number, an encrypted two-dimensional bar code, a contrast image and the like. Such images are indecipherable for the user and the third parties but decipherable only for the external device. Moreover, the user can recognize only presence or absence of the image, in other words, the user can only recognize whether the image is displayed on the EPD 11 or not.

Next, a reader of the external device reads the image (Step 6 or S6). The image is read by the user's action of bringing the reader close to the EPD 11 on which the encrypted image is displayed.

Here, the user can look the encrypted image on the EPD 11 so that the encrypted image is certainly read by the reader.

Subsequently, the external device decrypts the encrypted image read by the reader and an authentication of the user which determines whether the IC card is available or unavailable is conducted (Step 7 or S7).

When the authentication of the user is disapproved (Step 8 or S8), the IC card becomes unavailable. In this case, information telling that the user is not authenticated will be displayed on the EPD 11. The use of the IC card is then ended.

On the other hand, when the authentication of the user is approved and the IC card is available, confirmation of the bank account is conducted (Step 9 or S9). This allows the user to further carry out the ATM transaction.

As a result of the confirmation of the bank account, if the bank account is unavailable (Step 10 or S10), information telling that the bank account is unavailable will be displayed on the EPD 11. The use of the IC card is then ended. In Step 10, reasons why the bank account is unavailable may be displayed on the EPD 11. For example, indication telling that the bank account is closed, a short balance and the like may be displayed.

On the other hand, as a result of the confirmation of the bank account, if the bank account is available, the transaction is then started (Step 11 or S11). When the transaction is finished (Step 12 or S12), the IC card becomes unavailable (Step 13 or S13).

Furthermore, in Step 13, a password is set for the IC card from the external device. This password is needed to use the IC card next time and the password may be changed to a different password than the one used at a current time. Every time the IC card is used, a different password is used for authentication. Such password may be issued by an authentication system in the external device. The authentication system stores and manages the password. The same password is stored and managed in the memory in the IC card. The password is provided in a password table. Over 10,000 patterns of password are set in the password table and the password is issued every time the transaction finishes.

Moreover, the password is sent as a transmission signal to the IC card from the external device when the transaction finishes. The IC card receives the transmission signal and stores the password. The transmission of the password may be conducted through the external connection terminal or an antenna such as a loop coil embedded in the IC card.

Next, the displayed image on the EPD 11 is erased (Step 14 or S14).

The EPD 11 has a feature of storing a displayed image. Therefore, if the image on the EPD 11 is not erased and remained as it is displayed, it could be misused by third parties. In order to reduce such risk, the displayed image on the EPD 11 is erased.

When the above-mentioned string of actions is finished, the use of IC card is ended.

In the use of the IC card, the identity of the user is confirmed by the fingerprint authentication. Only when the user is identified, the transaction at the bank becomes available through an information-communication system using the encrypted image. The encrypted image is renewed each time of the transaction and a different encrypted image is used to conduct the transaction. If the encrypted image was the same image every time the transaction is carried out, identity theft could easily occur if once the image was stolen. However, here, the image is renewed each time of the transaction and a misuse of the IC card can be prevented. Furthermore, the display is erased when a transaction signal is received after the transaction finished. This is because the EPD 11 has the feature of storing a displayed image and displayed encrypted image remains on the screen. Therefore, the misuse of the IC card can be further prevented.

As described above, the IC card has the fingerprint sensor 10 and the EPD 11 according to the embodiment of the invention. It is possible to qualify the user of the system by conducting the identification of the IC card user with the finger print sensor 10. Consequently, the misuse of the IC card can be prevented. Furthermore, the IC card of the embodiment is not only used to conduct the above-mentioned identification but also equipped with the EPD 11. The encrypted image displayed on the EPD 11 can be read by the external device. Therefore, the information-communication between the IC card and the external device is possible through the encrypted image. Consequently, the IC card with higher security can be realized since the information-communication through the encrypted image is possible in addition to the fingerprint authentication.

Meanwhile, as means of the information-communication, antennas provided in the IC card and the external device can be used to electromagnetically communicate. However, in this embodiment, such electromagnetic means will not be used. The EPD 11 in the IC card displays the encrypted image and the external device reads the encrypted image. In this way, the information-communication is carried out. Accordingly, the user of the IC card can actually look and confirm that the image is displayed on the IC card or not, and then make the external device to read the image. On the contrary, the user cannot see and confirm the information with the electromagnetic means. Therefore, the embodiment of the invention has an advantage that the user can actually see with his eyes and confirm that the image is displayed on the IC card and then assuredly make the external device to read the image.

When a drive element such as the TFT gives a predetermined voltage for a predetermined period of time, the EPD 11 is able to hold the image without the voltage being further applied. In other words, the EPD 11 has the feature of storing or memorizing a displayed image. With such EPD 11, a power consumed by the display can be reduced. Therefore, it is possible to realize the IC card with the display memory and the low power consumption.

Furthermore, the displayed image of the EPD 11 is erased when the transaction finishes. The IC card can be invalidated by erasing the image. The image remained on the EPD 11 is erased so that the misuse of the IC card utilizing the remained image will be prevented. Consequently, a higher security can be realized.

Moreover, the encrypted image displayed on the EPD 11 is automatically refreshed and the image used between the external device and the IC card for the authentication is redrawn when the use of the IC card finishes. Accordingly, the encrypted image which is once displayed on the EPD 11 or the encrypted image which has been authenticated by the external device can be invalidated when the IC card is used the next time. This means that the external device uses a new and different encrypted image for the authentication every time the IC card is used. Therefore, it is possible to realize the IC card which has higher security.

The IC card has the connecting IC terminal 12 so that information can be transmitted between the IC card and the external device through the connecting IC terminal 12.

Furthermore, the IC card has the solar cell so that the IC card can be driven by the electric power which is generated by the irradiation of light. The solar cell can also serve as the light sensor so that it is possible to realize the IC card with the light switch which responds to the irradiation of light.

In the above-mentioned embodiment, though the transaction at the ATM of the financial institutions such as the bank was described as an example, the embodiment of the invention shall not be limited to this. The IC card according to the embodiment can be used for other transactions such as in credit cards and institutions that handle all kinds of personal information.

Second Embodiment of IC Card

Next, a second embodiment of the invention will be described.

Figure 8:
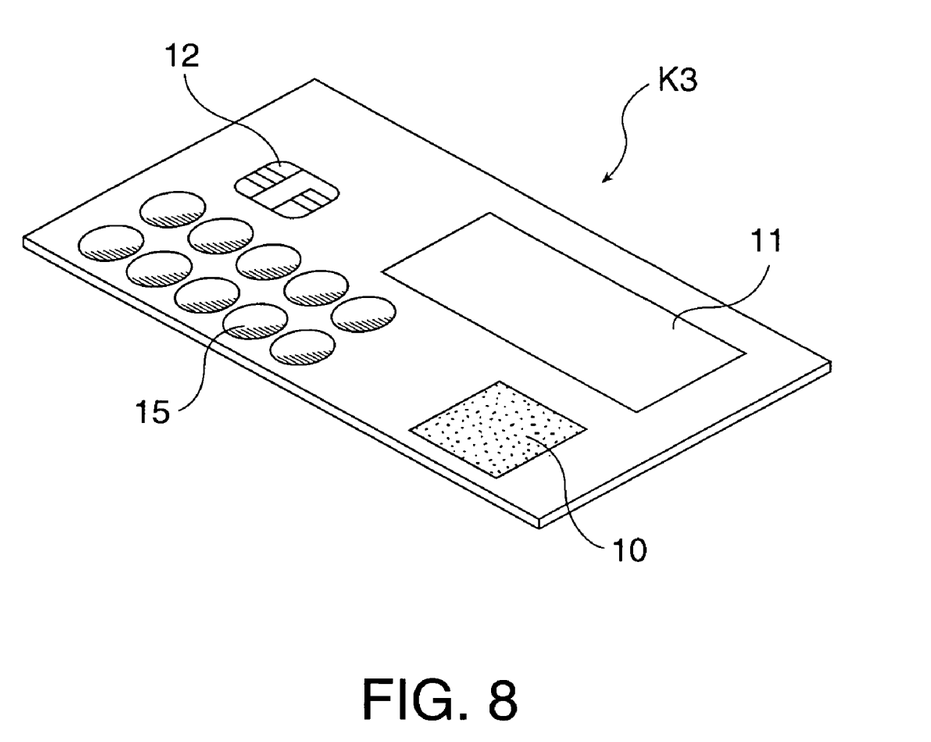
FIG. 8 is a perspective view of an IC card of a second embodiment in accordance with aspects of the present invention.

FIG. 8 is a perspective view of an IC card K3 of the second embodiment. In this embodiment, the IC card K3 has a membrane switch 15 (means of selection).

In the second embodiment, the same structures as those of the above-described first embodiment are given the identical numerals and those explanations will be omitted.

The membrane switch 15 is for selecting and determining an application which is available in the IC card K3. A plurality of applications is displayed on the EPD 11. The applications displayed on the EPD 11 is selected and determined by using the membrane switch 15.

The membrane switch 15 is not only used for selecting and determining the application but also for switching the power of the IC card K3 to the ON state (power on) from the OFF state (power off).

Such membrane switch 15 is coupled to the IC chip embedded in the IC card K3. The IC chip processes the input signal from the solar cell 14 and supplies the electrical energy stored in the battery charger to the EPD 11.

In the IC card K3 of the second embodiment, multipurpose applications are available by using the membrane switch 15, which will be described below.

(Multipurpose Transaction using IC Card)

Figure 9:
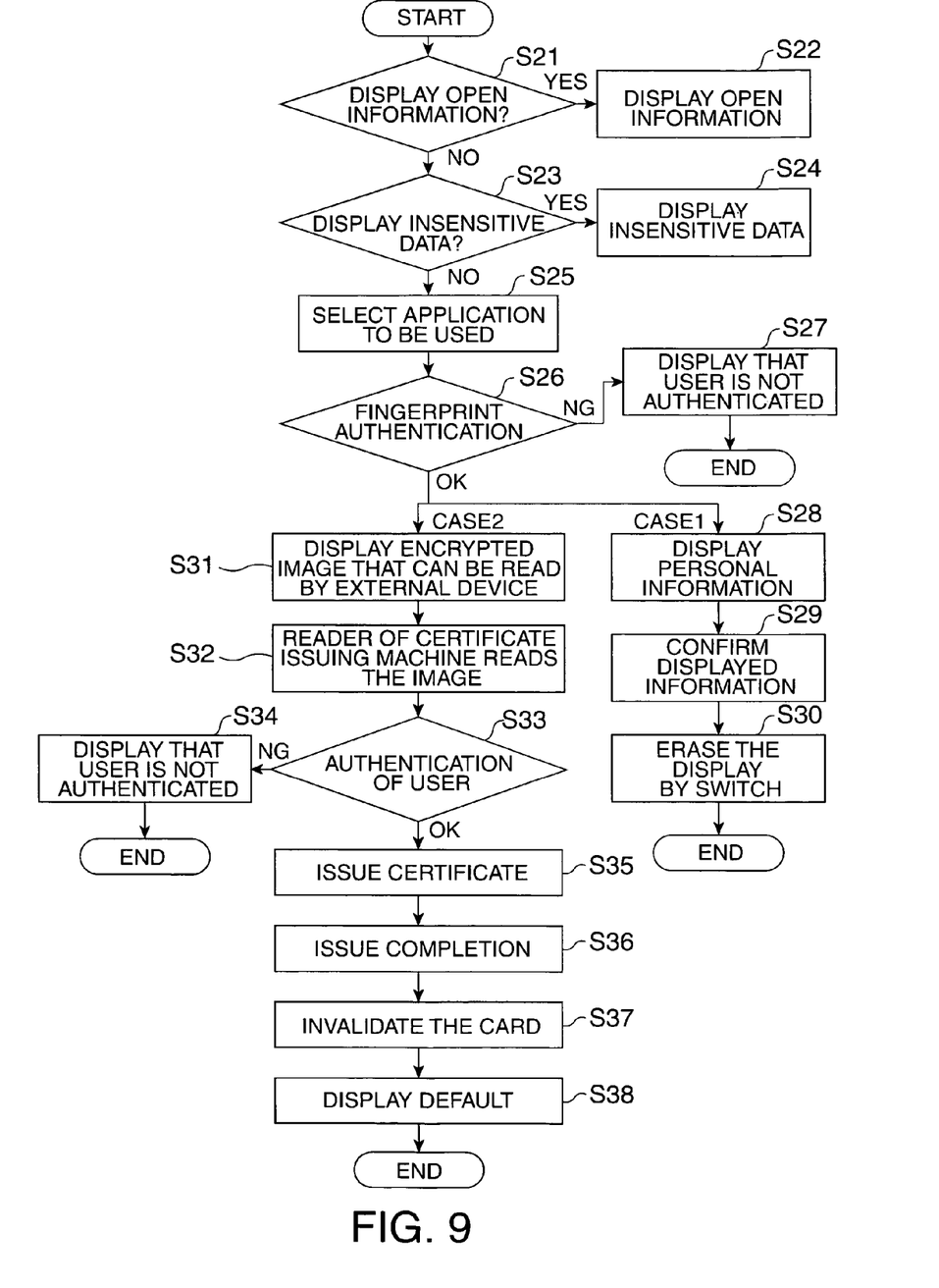
FIG. 9 is a flow chart of a transaction using the IC card of the second embodiment in accordance with aspects of the present invention.

Next, a multipurpose transaction using the above-described IC card is described. In the above-described first embodiment, the use of the IC card in the application, which is the transaction at the ATM of the financial institution, was described. In this embodiment, the plurality of the applications is available with the single IC card. FIG. 9 is a flow chart for explaining the multipurpose transaction.

In this embodiment, information which is handled by the IC card K3 is classified into three types. To be more specific, the information is classified into open information, relatively non-sensitive information and highly sensitive information. The open information is typified by advertisements. As the relatively non-sensitive information, a name and an address of an individual and the like may be applied. The highly sensitive information is confidential information which is likely misused by third parties. Such classified information is stored in the IC card K3 with a security whose degree corresponds to a degree of confidentiality of the information.

In this embodiment, "transaction" means not only the communication between the IC card and the external device but also the use of the application in a broad sense.

Next, a transaction process is described with reference to the flow chart.

First, a user turns the CPU of the IC card on.

In Step 21, the power of the CPU is turned on when the membrane switch 15 is turned on or when the finger print sensor 10 is touched.

Next, the open information is determined whether it is to be displayed or not (Step 21 or S21).

When the open information is decided to be displayed (Step 22 or S22), the open information is displayed on the EPD 11. The open information may be displayed as a default image of the EPD 11.

On the other hand, when the open information is decided not to be displayed, a judgment whether the relatively non-sensitive information is to be displayed or not is carried out (Step 23 or S23). When the non-sensitive information is decided to be displayed (Step 24 or S24), information which may be fine to be know by third parties, such as addresses and names, is displayed. If the relatively non-sensitive information is displayed in this way, it is possible to recognize the owner of the card, for example, when the IC card is lost and a third party picks up the IC card.

When the non-sensitive information is decided not to be displayed, go to Step 25 and an application which is to be used is selected.

The IC card K3 of the embodiment is used not only for the application of the transaction at the financial institutions such as banks but also for an application of certificates such as driving licenses, passports and insurance cards. The IC card K3 of the embodiment is also able to display the personal information of the IC card owner.

Furthermore, in the IC card K3 of the embodiment, it is possible to limit the user according to the application.

For example, when the application of the IC card K3 is the credit card or the cash card, it is possible to limit the users of the application to only two people, for example, a husband and a wife.

When the application of the IC card K3 is the driving license or the passport, for example, the user can be limited to a one person.

When the application of the IC card K3 is the insurance card or a point card for some commercial products, for example, all the family members can use the IC card.

In Step 25, one of such applications is selected. This selection of the application is conducted by turning any one of the membrane switches 15 in the IC card K3.

Next, the fingerprint authentication is carried out when the finger F of the user contacts with the fingerprint sensor 10 as shown in FIG. 4 (Step 26 or S26).

In Step 26, the fingerprint authentication is conducted by matching the fingerprint which contacts the fingerprint sensor 10 to the fingerprint of the application user which is selected in Step 25.

For example, when the selected application is the husband's driving license, only the husband is determined to be allowed to use the card by the fingerprint authentication. Therefore, the wife or other family members can not use the husband's driving license.

When the selected application is the cash card, only the husband and the wife are allowed to use the card by the fingerprint authentication. Therefore, other family members can not use the card.

When the selected application is the insurance card, the card is determined to be available for all the family members by the fingerprint authentication. Therefore, other people than the family members can not use the card.

As a result of the fingerprint authentication, when the fingerprint that is set according to the selected application disagrees with the fingerprint that contacts the fingerprint sensor 10 (Step 27 or S27), the user is not authenticated. In this case, information telling that the user is not authenticated will be displayed on the EPD 11. The use of the IC K3 card is then ended.

On the other hand, when the fingerprint that is set according to the selected application agrees with the fingerprint that contacts the fingerprint sensor 10 (Step 27 or S27), transactions or information discloser in the application which was selected in Step 25 is carried out.

For example, in a case that the application is the driving license (Case 1), go to Step 28 and the personal information which is written in the driving license is displayed (Step 28 or S28). After the user confirms the displayed information (Step 29 or S29), the display of the EPD 11 is erased by the input of the membrane switch 15 (Step 30 or S30). The use of the IC card is then ended.

When the application selected in Step 25 is an application for issuing certificates such as a residence certificate (Case 2), go to Step 31 and display the encrypted image which can be read by the external device.

The reader provided in the external device reads the encrypted image (Step 32 or S32). Subsequently, the external device decrypts the encrypted image read by the reader and the authentication of the user which determines whether the IC card K3 is available or unavailable is conducted (Step 33 or S33).

When the authentication of the user is disapproved (Step 34 or S34), the IC card becomes unavailable. In this case, information telling that the user is not authenticated will be displayed on the EPD 11. The use of the IC card is then ended.

When the authentication of the user is approved, the certificate is issued (Step 35 or S35). When the issuing is finished (Step 37 or S37), the IC card K3 becomes unavailable (Step 37). In Step 37, the displayed image on the EPD 11 is erased. The EPD 11 has the feature of storing a displayed image.

Therefore, if the image on the EPD 11 is not erased and remained as it is displayed, it could be misused by third parties. In order to reduce such risk, the displayed image on the EPD 11 is erased.

Next, the EPD 11 displays the default image (Step 38 or S38).

When the above-mentioned string of actions is finished, the use of IC card K3 is ended.

As described above, with this IC card K3, it is possible to utilize electronic information which certifies the identity of the user based on an electronic encryption technology. For example, this card can be applied to a certificate which should not be easily forged by third parties, such as passports, driving licenses and insurance cards. Furthermore, digital information including, for example, a public key of the user, a name of the user, a name of the institution that issued the certificate, an effective period, a serial number and the like may be stored in the certificate. An intended use is then selected by the membrane switch 15 according to the application. An electronic certificate is properly transmitted only through an information-communication using a predetermined encrypted image and in a specified terminal system.

It is also possible to limit the user according to the application. The fingerprint information (fingerprint pattern which is to be authenticated) may be registered with respect to each available application. For example, a user of the driving license and the passport may be limited to the owner himself.

According to the embodiments of the invention, the user of the IC card can be limited by conducting the authentication of the IC card using the fingerprint sensor 10. Therefore, the misuse of the IC card can be prevented. Furthermore, the IC card of the embodiment is not only used to conduct the above-mentioned identification but also equipped with the EPD 11. The encrypted image displayed on the EPD 11 can be read by the external device. Therefore, the information-communication between the IC card and the external device is possible through the encrypted image. Consequently, the IC card with higher security can be realized since the information-communication through the encrypted image is possible in addition to the fingerprint authentication.

Moreover, the plurality of the applications which are registered in advance can be used with the single IC card. These applications can be confirmed with the EPD 11 and selected by the membrane switch 15. Furthermore, finger prints of the different user can be registered with respect to each application. The user can also be limited with respect to each application.

Aspects of the invention may be used with a card reader that has an input/output that exchanges information with the IC chip on the card. The user may exchange information with a user interface on the card reader. Alternatively, the user may input all transactional information on the card itself (for instance, so that the user can indicate to the IC card what transaction the user wants to perform and, once inserted into the card reader, the desired action is performed). Further, the IC card reader may also verify that the information entered by the user is correct and/or that the IC card reader can perform the action desired by the user.

Although the embodiments of the invention have been fully described by way of example with reference to the accompanying drawings, it is to be understood that the embodiments described hereunder do not in any way limit the scope of the invention. Configuration or combination of the above-mentioned members in the embodiments is just an example, and various changes and modifications will be applied within the scope and spirit of the present invention.

What is claimed is:

1. An IC card, comprising:
    a fingerprint sensor;
    a display device for displaying an encrypted image that is readable by an external device;
    a control unit controlling the fingerprint sensor and the display device, the control unit performing a first authentication based on a fingerprint of a user scanned by the fingerprint sensor, displaying the encrypted image on the display device, after the first authentication, the encrypted image being used for a second authentication performed by the external device, the second authentication including the external device reading the encrypted image after the first authentication is made, the external device decrypting the encrypted image read by the external device, and the external device authenticating the user based on the decrypting of the encrypted image, the control unit erasing the encrypted image displayed by the display device after a transaction is carried out between the IC card and the external device based on the second authentication, and the control unit displaying a default image on the display device after the transaction is carried out; and
    a memory that stores the encrypted image and the default image.

2. The IC card according to claim 1, wherein the display device is an electrophoretic display device.

3. The IC card according to claim 1, wherein the control unit compares an extract fingerprint pattern that is extracted by the fingerprint sensor with a recognition fingerprint pattern that is registered in advance.

4. The IC card according to claim 1, wherein the control unit automatically renews the encrypted image.

5. The IC card according to claim 1, wherein the control unit stores a plurality of applications.

6. The IC card according to claim 1, wherein the control unit stores a plurality of recognition fingerprint patterns that are registered in advance.

7. The IC card according to claim 5, wherein the control unit stores an available recognition fingerprint pattern with respect to each of the plurality of the applications.

8. The IC card according to claim 5, further comprising:
    a selector selecting any of the plurality of the applications that are stored in the control unit.

9. The IC card according to claim 1, further comprising:
    an external connection terminal that is connectable to the external device.

10. The IC card according to claim 1, further comprising a solar cell.

11. A card reader comprising:
    a first interface that exchanges information with an IC card, said IC card having a fingerprint sensor, a display device that displays an encrypted image, a memory that stores the encrypted image, and a control unit that controls the fingerprint sensor and the display device and that performs a first authentication based on a fingerprint of a user scanned by the fingerprint sensor, displays the encrypted image on the display device, after the first authentication, the encrypted image being used for a second authentication performed by the card reader, the second authentication including the card reader reading the encrypted image after the first authentication is made, the card reader decrypting the encrypted image read by the external device, and the external device authenticating the user based on the decrypting of the encrypted image, the control unit erasing the encrypted image displayed by the display device after a transaction is carried out between the IC card and the card reader based on the second authentication, and displays a default image on the display device after the transaction is carried out;

a processor that performs the second authentication by determining if information from said IC card is correct and performs the transaction desired by a user.

12. The IC card according to claim 1, wherein the external device authenticates the IC card based on a password stored in the memory of the IC card and, when a transaction between the IC card and the external device finishes, the external device transmits a new password to the IC card to store in the memory for use during a next transaction.

13. The IC card according to claim 1, wherein the encrypted image is renewed for each transaction between the IC card and the external device.

* * * * *